(12) United States Patent
Williams

(10) Patent No.: US 9,989,264 B2
(45) Date of Patent: Jun. 5, 2018

(54) HEATING TILE

(71) Applicant: Bruce Blaine Williams, Gillette, WY (US)

(72) Inventor: Bruce Blaine Williams, Gillette, WY (US)

( * ) Notice: Subject to any disclaimer, the term of this patent is extended or adjusted under 35 U.S.C. 154(b) by 196 days.

(21) Appl. No.: 14/999,598

(22) Filed: Jun. 1, 2016

(65) Prior Publication Data

US 2017/0350604 A1    Dec. 7, 2017

(51) Int. Cl.
*F24D 13/02* (2006.01)
*H05B 3/26* (2006.01)

(52) U.S. Cl.
CPC ......... *F24D 13/024* (2013.01); *F24D 13/022* (2013.01); *H05B 3/26* (2013.01); *H05B 2203/026* (2013.01)

(58) Field of Classification Search
CPC ...... F24D 13/02; F24D 13/022; F24D 13/024; H05B 3/20; H05B 3/26; H05B 2203/026
See application file for complete search history.

(56) References Cited

U.S. PATENT DOCUMENTS

| | | | | |
|---|---|---|---|---|
| 4,581,522 A | * | 4/1986 | Graham | F24D 19/1096 219/213 |
| 4,922,084 A | * | 5/1990 | Hutter | F24D 13/02 219/213 |
| 8,306,408 B2 | * | 11/2012 | Abbott | B32B 7/02 219/213 |
| 8,461,486 B2 | * | 6/2013 | Feng | H05B 3/28 219/213 |
| 2006/0191903 A1 | * | 8/2006 | Naylor | E01C 11/265 219/528 |
| 2006/0261057 A1 | * | 11/2006 | Horvath | H05B 3/342 219/529 |
| 2012/0175359 A1 | * | 7/2012 | Zimmerer | F24D 13/022 219/213 |
| 2012/0292306 A1 | * | 11/2012 | Lai | F24D 13/024 219/520 |

* cited by examiner

*Primary Examiner* — Ryan A Reis

(57) ABSTRACT

A heating tile designed to be easily installed using standard construction methods and materials while providing a radiant heating method that is compatible with both computer controlled systems as well as simple thermostat controls, can be repaired without major floor rework, does not produce a significant magnetic field, is protected against overheating due to excessive exposed surface insulation, and is water and contaminant resistant even if there is minor cracking of the tile.

6 Claims, 2 Drawing Sheets

HEATING TILE

References Cited

U.S. Patent Documents

| | | | |
|---|---|---|---|
| 1,015,991 | Electric Heating pad | January 1912 | Clark |
| 2,004,857 | Apparatus for the distribution of heat | June 1935 | Deriaz |
| 2,533,409 | Electrical heating System ************ | December 1950 | Tice |
| 2,559,077 | Resistive heating elements | July 1951 | Johnson et al. |
| 2,782,289 | Heating device [Wire resister heater] | February 1957 | Nathanson |
| 3,015,016 | Electrical heating units and the like [floor] | December 1961 | Cole |
| 3,153,140 | Radiant heating panel | October 1964 | Theodore et al. |
| 3,255,337 | Electrical heating pads for floors | June 1966 | Willat |
| 3,277,419 | Laminated heating unit | October 1966 | Butz |
| 4,327,282 | Electrical resistance heating element | April 1982 | Nauerth |
| 4,370,548 | Electrical heating element | January 1983 | Nagasawa et al. |
| 4,401,885 | Planar heat generating device | August 1983 | Ishii et al. |
| 4,426,573 | PTC Heating element | January 1984 | Fudickar et al. |
| 4,439,666 | Electrical heating system | March 1984 | Graham |
| 4,581,522 | Electrical heating system including a mesh heating element | April 1986 | Graham |
| 7,193,179 | Channeled under floor heating element | March 2007 | Horvath, et al. |
| 7,193,191 | Under floor heating element | March 2007 | Horvath, et al. |
| 8,306,408 | Radiant heating using heater coatings | November 2012 | Abbott |
| 8,461,486 | Heating Tile And Heated Floor Using The Same | Jun. 11, 2013 | Feng et al. |
| 9,185,748 | Electrical panel heating device and method and building materials for the protection thereof | November 2015 | Zimmerer, et al. |

FEDERALLY SPONSORED RESEARCH OR DEVELOPMENT

None

PARTIES TO A JOINT RESEARCH AGREEMENT

None

RELATED APPLICATIONS

None

PRIOR DISCLOSURES

None

BACKGROUND

1. Technical Field

The present disclosure generally relates to heating tiles and heated floor and floor back splashes using the same.

2. Description of Related Art

Heating a house in the present art can be divided into three distinct methodologies. The first is forced air heat. In this method there is a central heat source which involves the transfer of heat to air that is then forced throughout the house using an air fan.

This method has several drawbacks, primarily in that it produces a flow of air in the various rooms which causes noise and the side effect that moving air cools items quicker than stationary air. Since it is not practical to heat the air sufficiently high to cancel the cooling effect, there is generally a false feeling of coolness as the warmed a it is first forced into the rooms. It also requires the use of duct work which is not readily accessible and, due to the amount of air that goes through it, tends to collect contaminants which when disturbed can be spread throughout the house.

Their second general failure is that unless specifically designed with a lot of expensive "duct heaters" or dampers to control volume of air flow, individual rooms cannot be adjusted for the comfort of the applicable situation, such as sleeping rooms and cooking rooms verses living rooms or dens.

And the third disadvantage is that it is subject to the total loss of heating on a single failure. Any failure in the single unit heat source causes a complete loss of heating to the entire heated area.

The advantage to this system is that external air can be selectively introduced into the air stream and help keep gasses such as $CO_2$ or $CO$ from accumulating in the house.

The second method consists of using convection heating. In convection heating air is heated up by a relatively small local device such as a steam radiator or electrical baseboard heater. This heating method has three disadvantages including—by heating the air and letting it rise, the highest part of the structure is heated first and the lowest last, resulting in ceilings and upper floors that are relatively hot while the lower floor(s) are comfortable. This can be overcome by the proper use of ceiling fans and automatic doors, but these items are just unrelated capital and running expenses that are not directly supplying heat.

The second problem is that the heater is generally located either right on a wall or right next to a wall and this causes the paint in those areas to suffer from heat damage/fading over the years and the collection of unsightly contaminant deposits due to the air passing over these specific areas. In addition these systems place limitations on where room furniture can be placed as they generally require a minimum distance to combustible material. Removing wall space that could be used for furniture placement and/or decorative purposes.

The third disadvantage to this method is the lack of outside air introduction due to there being no force air involved.

The major advantage to convection heat is that you can control the heat on a room or even side of a room basis, which makes for a more comfortable overall heat compared to forced air heat.

The third method most commonly used is radiant heat, of which this device applies. Radiant heat overcomes most of the disadvantages of the other two systems. It is room specific heat and therefor, like convection heat, can make the house more comfortable and if properly designed can produce localised heat within a room on a finer scale than even convection heat.

It inherently overcomes the rapid air flow of forced air heat without any requirement for extra apparatus to keep the heat in low areas like convection heat requires.

The present art in radiant heat has some major disadvantages though. One of the most popular methods of radiant heat is that of hot water circulation under a floor. This method has several disadvantages including requiring access below the floor to use or take the chance you will have to remove your entire floor if there is ever a need to repair any defects that develop, both being expensive.

This method also introduces the problem of a leak in the water piping. If this occurs there is a good chance more than just the piping will be damaged and water damage is an add on to the insurance of a house. Along with that is that a slow leak may not be detected and may allow an unhealthy amount of mold to build up in hidden areas.

The water heating method also suffers from the total loss of heating on a single failure problem since any failure in the single heat source causes a complete loss of heating to the entire heated area.

Another disadvantage to water heating and forced air heating is the inefficiency of the methodologies. Both require a heating device somewhere to heat up the air/water and since most systems only run 80% to 90% efficient you are spending an additional 5% to 10% just for the convenience of the single heating unit (the other ½ efficiency loss will likely go to heating one of the heated areas, such as the room the heating unit is in).

Another disadvantage to water or under floor forced air radiant heat is that the extra equipment will require maintenance and thus will be another expense not associated directly with producing heat.

BRIEF SUMMARY OF THE INVENTION

This invention overcomes several of the deficiencies of other radiant floor heating methods. By using modified existing tiles or stones or their non flammable equivalents you can install the heating system using methods practiced and materials used since ancient times, and well understood and practiced throughout the world. This is a significant savings in installation costs due to the expense of extra training for installers, and the materials used in installation would be off the shelf and readily available.

In addition, it overcomes the purchase of centralized heating units used in water systems and underfloor heated air systems. It also overcomes the expense of either purchasing treated wood for floor joists to prevent dry rot, or the expense of heating ducts for under floor heated air systems.

It does not require the use of water, which means there is no additional insurance considerations or worry about mold buildup.

It can be connected to standard household wiring systems (according to local electrical codes) and controlled by systems varying from complex energy management systems to simple single room thermostats. The control scheme can be simple on/off to sophisticated variable power control and zone control even within a single room. And upgrades are simply a matter of upgrading the control system, the tiles will stay the same and can be wired during installation to accommodate any future plans.

The work and planning involved in installing the tiles will be little more than what is required for the same floor using just tiles, and the material cost will be equivalent to a high end convection system, and less than either under floor forced air or heated water systems.

Radiant heat also allows the homeowner to lower the thermostat setting to keep the same feeling of warmth. Since the heat produced is primarily of a radiating nature it will not heat the ceiling or upper rooms as much as forced air or convection heating, and like the hot water and under floor heated air systems, will use less power of the same degree of comfort.

The one item this invention does not address is the addition of external air to the building as can be accomplished with forced air systems.

BRIEF DESCRIPTION OF THE DRAWINGS

Many aspects of the embodiment's can be better understood with reference to the following drawings. The components in the drawings are not necessarily drawn to scale, the emphasis instead being placed upon clearly illustrating the principles of the embodiment's. Moreover, in the drawings, like reference numerals designate corresponding parts throughout the several views.

DETAILED DESCRIPTION OF THE INVENTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
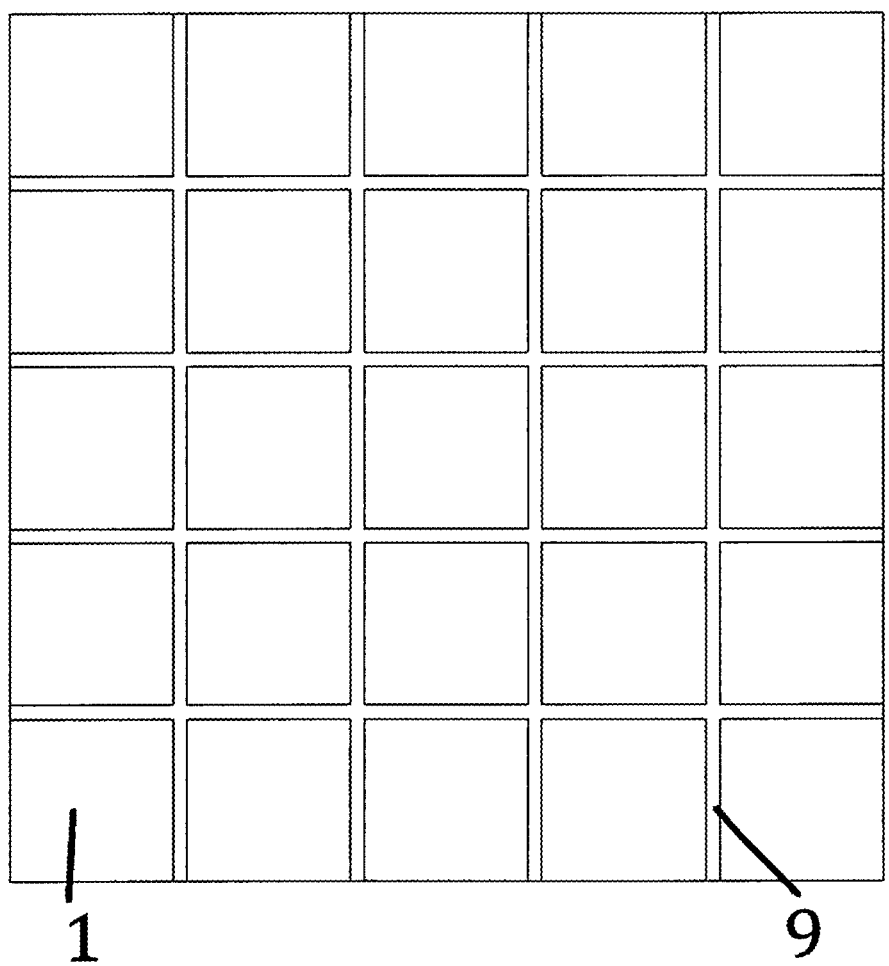
FIG. 1 is a schematic view of one embodiment of a heated tiled floor. Although this embodiment shows squares, the invention applies to any shape or arrangement of tiles.

Referring to FIG. 1, a heating floor according to one embodiment is shown. The heating floor includes a plurality of heating tiles (1) disposed side by side and may be of any shape the design requires. The plurality of heating tiles (1) are arranged to form a plurality of lines and rows between which there may be a gap filled with some form of grout or equivalent (9) in another embodiment the heating tiles (1) may be placed next to each other with no deliberate gap (9). The plurality of heating tiles (1) can be fixed with the floor using the standard tile securing material methods and materials.

The plurality of heating tiles (1) can be electrically interconnected in any fashion as appropriate for the installation. The embodiments include but are not limited to being connected by number of tiles, or grouped according to the designers plans, or the control system limitations, but in no case to exceed the current rating of the cold leads (6) of the tiles (1).

For safety and assembly reasons the tile (1) must be of rigid design and its electrical conductivity greater than or equal to $1 \times 10^6$ $\Omega$m. This ohmic value will act as a second insulator in case of failure of either the cold lead insulation or the heating element insulation, similar to a double insulated drill.

Figure 2:
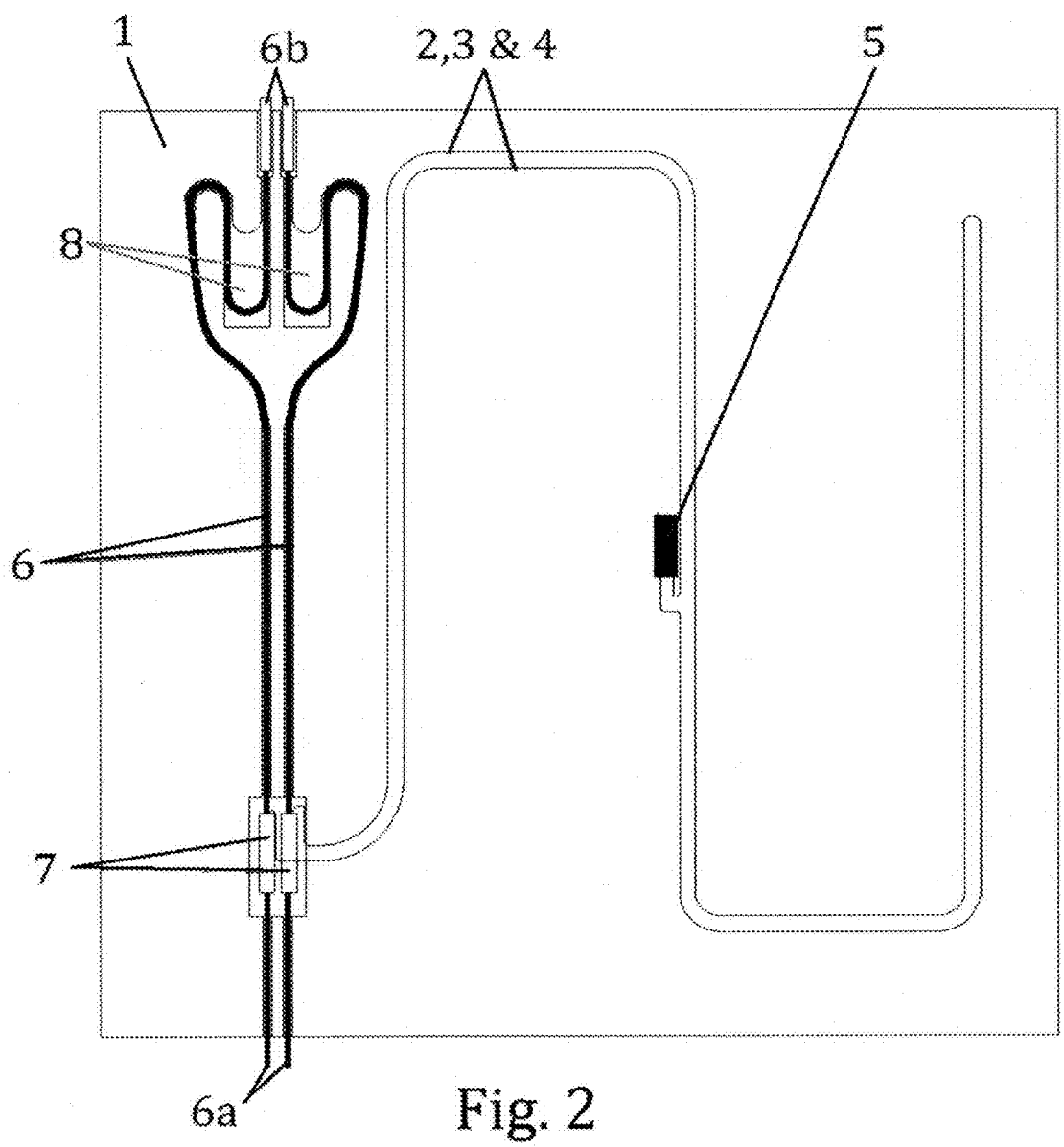
FIG. 2 is a schematic of a heating tile used in the heating floor in FIG. 1. The layout of one embodiment is shown. The exact placement of the components is dependent on the design of the tile but all components that are required are presented.

Referring to FIG. 2, each heating tile (1) includes channels (2) inlaid with the resistive heating element (3) such that it has the ability to slide within the channels (2) and have a flexible water tight insulation (4) to allow minor cracking of the tile and shifting caused by normal floor deformations without exposing the resistive heating elements (3) to contact with liquids or the encroachment of fine contaminants. In one embodiment this inlaying of the resistive heating elements (3) could be done with tape holding the wire into the channel with the tape also stuck to the outside of the bottom of the tile itself. In this embodiment the tape must not be water proof in order to ensure liquids do not fill the channel. Other equally effective embodiments are also applicable. The wattage of the resistive heating elements will be dependent upon their usage environment.

In line with the resistive heating element (3) there is an automatic reset over temperature sensor (5) to prevent the tile from getting to hot. The over temperature sensor (5) would be activated by such things as storing large flat objects on the tile while the heat is on, or being covered by items placed on the floor such as pillows, blankets, throw rugs, etc. The over temperature sensor (5) may be located in different spots based on design and layout criteria and tile (1) shape and characteristics. The over temperature sensor (5) in one embodiment would be set for around 40° C. (104° F.) for a human occupancy and in other embodiments may require higher or lower temperatures depending on their application.

In one embodiment the channels (2) for the resistive heating elements (3) and the two cold leads (6) are no more than 5 mm apart and laid out so the currents in the wires in the two adjacent channels are flowing in opposite directions. In other embodiments there may be only one channel (2) for the resistive heating elements (3) and one channel (2) for the two cold leads (6) or other combinations of single and dual channels (2) in which case the wires in single channels (2) will be laid such that the currents in the adjacent wires are opposing. This arrangement will severely reduce if not totally eliminate any magnetic fields associated with the flow of electric current.

The two cold leads (6) are shown going straight through the tile (1), but can be designed to enter/leave any side, or even multiple sides if the design requires it. This allows the tiles (1) to be designed so some may act as corner pieces or straight through pieces, or even multiple branch pieces as would best fit the application. The two cold leads are shown in channels, but must not be permanently attached to the tile (1) or cracking of the tile may damage the insulation of one or more of the two cold leads (6). In one embodiment the method of holding the two colds leads 16) in place can mimic the method for the resistive heating elements (3) or can be a different method.

First end cold lead (6a) is the end which mates up to the second end (6b) cold lead and consists of enough bare electrically conductive material to make up with the connector on the second end (6b). The cold lead second end (6b) can be either a slip in connector or a mechanical connector using mechanical compression or soldering as the attachment method. The method used will depend on Electrical codes in the areas the tile (1) is designed to be used in. When attached together the first end cold lead (6a) and the second end cold lead (6b) must form a water tight connection to prevent any water or fine contaminates from forming an electrical bridge to the environment.

The slack take up chamber (8) will only be required in the embodiment where either types mechanical connections or solder sleeve connectors are used. This allows the connection to be made up and then any slack pushed back into the tile (1). On very thin tiles (1), this chamber may not be used and the leads may be countersunk into the flooring as determined by the installer. The exact size and shape of the take up chamber (8) will depend on the characteristics of the cold leads (6,6a & 6b). The illustration is generic and not to scale.

Each cold lead (6) to resistive heating element (7) connection is done at some point along the cold leads (6). The chamber may actually be the channel (2) the cold leads (6) are running in or in another embodiment where both cold leads (6) are within one channel (2) depending on the tile (1) material and construction. It's exact placement will depend on the layout of the resistive heating element (3) and were the most economical attachment point is.

Heating tile (1) provides a method of installation which requires minimum expertise outside of the normal expertise which would be required to install the tile without heat. It allows an installation in existing houses with little more effort than what would be required for a new floor overlay.

It is to be understood that the above-described embodiment's are intended to illustrate rather than limit the present disclosure. Variations may be made to the embodiment's without departing from the spirit of the disclosure as claimed. It is understood that any element of any one embodiment is considered to be disclosed to be incorporated with any other embodiment. The above-described embodiment's illustrate the scope of the disclosure but do not restrict the scope of the disclosure.

The invention claimed is:

1. A heating tile, comprising:
   an inflammable tile of rigid design with an electrical conductivity value greater than or equal to $1 \times 10^6$ Ωm; and
   recessed channels in the tile holding a resistive heating element, an over temperature sensor, and two cold leads,
   wherein a flexible water tight insulation is installed over the resistive heating element.

2. The heating tile of claim 1, wherein the resistive heating element is placed such that it has the ability to slide within the recessed channels.

3. The heating tile of claim 1, wherein the over temperature sensor is wired in series with the resistive heating element to shut current flow off if the temperature of the tile exceeds a preset value.

4. The heating tile of claim 1, wherein the two cold leads are placed in their appropriate channels and not permanently adhered to the tile.

5. The heating tile of claim 1, wherein the resistive heating element is attached to the two cold leads.

6. The heating tile of claim 1, wherein the two cold leads are terminated with those on one end being of exposed electrically conductive material and the other end being of either a hard and fast connector or a slide connector, both of which shall have a water tight seal against exposing the bare electrically conductive material to liquids or fine contaminants after installation.

* * * * *